United States Patent
Passmann et al.

(10) Patent No.: US 10,612,928 B2
(45) Date of Patent: Apr. 7, 2020

(54) METHOD AND DEVICE FOR ESTABLISHING AND PROVIDING A HIGH-PRECISION CARD

(71) Applicant: Robert Bosch GmbH, Stuttgart (DE)

(72) Inventors: Christian Passmann, Diekholzen (DE); Daniel Zaum, Sarstedt (DE); Peter Christian Abeling, Hannover (DE); Stefan Werder, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 88 days.

(21) Appl. No.: 15/961,130

(22) Filed: Apr. 24, 2018

(65) Prior Publication Data

US 2018/0313652 A1 Nov. 1, 2018

(30) Foreign Application Priority Data

Apr. 28, 2017 (DE) .................. 10 2017 207 257

(51) Int. Cl.
| | |
|---|---|
| *G01C 22/00* | (2006.01) |
| *G01C 21/28* | (2006.01) |
| *G05D 1/02* | (2020.01) |
| *G05D 1/00* | (2006.01) |
| *G01C 21/32* | (2006.01) |
| *G01C 21/36* | (2006.01) |

(52) U.S. Cl.
CPC ............ *G01C 21/28* (2013.01); *G01C 21/32* (2013.01); *G01C 21/3667* (2013.01); *G05D 1/0088* (2013.01); *G05D 1/0212* (2013.01)

(58) Field of Classification Search
CPC ..... G01C 21/28; G01C 21/32; G01C 21/3667
See application file for complete search history.

(56) References Cited

U.S. PATENT DOCUMENTS

2018/0099661 A1* 4/2018 Bae .................... G06K 9/00818

FOREIGN PATENT DOCUMENTS

| DE | 102007059906 A1 | 6/2009 |
| DE | 102014104574 A1 | 10/2015 |
| DE | 102015205133 A1 | 9/2016 |
| DE | 102015218970 A1 | 3/2017 |

* cited by examiner

*Primary Examiner* — Adam M Alharbi
(74) *Attorney, Agent, or Firm* — Norton Rose Fulbright US LLP; Gerard Messina

(57) ABSTRACT

In a method and a device for preparing and providing a highly accurate map, steps are performed which include receiving first surroundings data values that represent first surroundings of at least one vehicle and that are detected using a surroundings sensor system of the at least one vehicle; receiving second surroundings data values that represent second surroundings of at least one traffic infrastructure area and that are detected using at least one traffic infrastructure sensor; generating the highly accurate map based on the first and second surroundings data values, and outputting the highly accurate map.

18 Claims, 3 Drawing Sheets

METHOD AND DEVICE FOR ESTABLISHING AND PROVIDING A HIGH-PRECISION CARD

CROSS-REFERENCE TO RELATED APPLICATIONS

The present application claims priority under 35 U.S.C. § 119 to DE 10 2017 207 257.1, filed in the Federal Republic of Germany on Apr. 28, 2017, the content of which is hereby incorporated by reference herein in its entirety.

FIELD OF THE INVENTION

The present invention relates to a method and device that includes a step of receiving first surroundings data values, a step of receiving second surroundings data values, a step of generating and providing a highly accurate map based on first surroundings data values and second surroundings data values.

SUMMARY

According to an example embodiment, a method of preparing and providing a highly accurate map includes a step of receiving first surroundings data values, which represent a first surroundings of at least one vehicle, the first surroundings data values being detected with the aid of a surroundings sensor system of the at least one vehicle; a step of receiving second surroundings data values, which represent a second surroundings of at least one traffic infrastructure area, the second surroundings data values being detected with the aid of at least one traffic infrastructure sensor; a step of preparing the highly accurate map based on the first surroundings data values and based on the second surroundings data values; and a step of providing the highly accurate map.

In an example, a surroundings sensor system of the at least one vehicle is understood to mean, for example, one or multiple cameras and/or one or multiple radar sensors and/or one or multiple LIDAR sensors and/or one or multiple ultrasonic sensors and/or at least one additional sensor, which is/are designed to detect the first surroundings of the at least one vehicle in the form of first surroundings data values.

In the context of the method according to the present invention, any vehicle can be an automated vehicle and/or a vehicle manually operated by a driver, except if one of the two variants is expressly ruled out. An automated vehicle is understood to mean a semi-automated, highly automated, or fully automated vehicle.

A traffic infrastructure area is understood to mean, for example, a road or a road section, a roadway, at least one roadway boundary, at least one roadway marking, and/or at least one traffic sign on, near, and/or above the roadway. A traffic infrastructure area is further understood to mean, for example, a traffic intersection and/or a bridge and/or a tunnel and/or an on-ramp or exit ramp and/or a parking garage and/or a parking lot and/or an underground garage and/or any area, which is driveable and/or accessible with the aid of a vehicle.

The method according to the present invention has an advantage that the highly accurate map is prepared in such a way that a vehicle can be operated in accordance therewith, as a result of which the safety for the vehicle and/or for the occupants and/or the safety for additional vehicles and/or for other road users in the surroundings of the vehicle is enhanced.

The highly accurate map is preferably prepared by recognizing a first map as not complete according to first predefined criteria and/or as not updated according to second predefined criteria and the highly accurate map is complete according to the first predefined criteria and/or is updated according to the second predefined criteria, and by replacing the first map with the highly accurate map.

A first map and/or a highly accurate map is understood to be a digital map, which exists in the form of (map-) data values in a memory medium. The first map and/or the highly accurate map is designed, for example, in such a way that one or multiple map layers are encompassed, one map layer, for example, showing a map from a birds-eye perspective (course and position of streets, buildings, landscape features, etc.). This corresponds, for example, to a map of a navigation system.

Another map layer includes, for example, a radar map, surroundings features included in the radar map being stored with a radar signature, for example. Another map layer includes, for example, a LIDAR map, surroundings features included in the LIDAR map being stored with a LIDAR signature.

Another, additional and/or alternative map layer includes, for example, temporary conditions in the first surroundings and/or in the second surroundings such as, for example, precipitation and/or fog and/or lighting conditions.

The first map and/or the highly accurate map is/are designed in such a way that they are suited for navigating a vehicle, in particular, an automated vehicle. For this purpose, the individual map layers encompass, for example, at least the first surroundings and/or the second surroundings with geo-positions, these positions being highly accurately known. A highly accurate position is understood to be a position which is accurate to such an extent that an operation of an automated vehicle is possible as a function of this position. This is understood to mean, for example, an inaccuracy of the position of less than 10 cm.

The first predefined criteria are understood to mean, for example, that the first map has gaps, in which the traffic infrastructure area is not completely captured and/or the first map is lacking a particular map layer.

The second predefined criteria are understood to mean, for example, that the first map includes a timestamp for all surroundings that are encompassed in the first map, which indicates a time of the last update and, in particular, the timestamp is too old with respect to the first surroundings and/or the second surroundings, i.e., the first map is outdated with respect to the first surroundings and/or to the second surroundings. This occurs, for example, if the first map must be updated within a predefined time span (1 day, 1 month, 1 year, etc.) and the update has not yet taken place.

This yields the advantage that invariably only the most updated map and/or most accurate map is available, which is thus constantly iteratively improved upon repetition of the method, since the first map corresponds to a map already previously highly accurate and the next highly accurate map is still further improved and/or adapted.

The highly accurate map is prepared preferably by assessing and/or changing the first surroundings data values according to third predefined criteria as a function of the second surroundings data values.

The third predefined criteria are understood to mean, for example, that the sensor properties such as, for example, a detection area and/or a resolution and/or preferred environmental influences (brightness, weather, etc.) and/or additional parameters, are accurately known with respect to the at least one traffic infrastructure sensor, whereas the surroundings sensor system is to a great extent a function of the type of sensor and, for example, of the movement of the at least one vehicle.

Thus, based on the precise knowledge of the sensor properties of the traffic infrastructure sensor, for example, the plausibility of the detected first surroundings data values can be checked. Furthermore, the first surroundings data values can also and/or alternatively be changed, for example, by removing individual surroundings features encompassed in the first surroundings data values from the first surroundings data values and/or by adapting proportions.

This yields the advantage that the quality of the highly accurate map is increased based on the assessment and/or on the change of the first surroundings data values.

The highly accurate map is preferably provided in such a way that another vehicle and/or the at least one vehicle is/are operated in an automated manner as a function of the highly accurate map.

An operation of a vehicle is understood to mean, for example, that the highly accurate map is provided for a navigation system of the vehicle. In another example embodiment, the highly accurate map is provided for a vehicle, for example, in such a way that the vehicle is moved as a function of the highly accurate map with the aid of a lateral control and/or longitudinal control, in particular, along a trajectory that is determined by the highly accurate map. An operation of a vehicle is further understood to mean that, for example, the highly accurate map is displayed to an operator of the vehicle (driver, occupant, etc.), with the aid of an output unit (screen).

The highly accurate map is also used, for example, to calibrate at least one sensor of the one additional vehicle and/or of the at least one vehicle by comparing the detected data values of the sensor with data values to be expected from the highly accurate map.

This yields the advantage that the operation of the at least one additional vehicle and/or of the at least one vehicle using the highly accurate map is safer and/or more efficient.

An additional step of receiving third surroundings data values is preferably also provided, the third surroundings data values representing at least partially the second surroundings of the traffic infrastructure area, the third surroundings data values being detected with the aid of at least one additional traffic infrastructure sensor, and the highly accurate map being prepared based on the first surroundings data values and being based on the second surroundings data values and/or on the third surroundings data values, as a function of a surroundings condition of the second surroundings.

This yields, in particular, the advantage that the plausibility of the second surroundings data values and of the third surroundings data values can be checked or the plausibility of the first surroundings data can be checked with the second surroundings data values and/or with the third surroundings data values. Furthermore, the use of at least one additional traffic infrastructure sensor is advantageous since, depending on the situation, (for example, due to lighting conditions and/or since the at least one traffic infrastructure sensor and/or the at least one additional traffic infrastructure sensor is concealed and/or due to weather conditions), the second surroundings data values are increasingly used for preparing the highly accurate map compared to the third surroundings data values, or vice versa.

The at least one traffic infrastructure sensor and/or the at least one additional traffic infrastructure sensor is understood to mean, for example, a video sensor and/or radar sensor and/or LIDAR sensor and/or ultrasonic sensors and/or at least one additional sensor, which is/are designed to detect the second surroundings (at least partially) in the form of second surroundings data values and/or third surroundings data values.

The at least one traffic infrastructure sensor and/or the at least one additional traffic infrastructure sensor is/are designed, for example, to be on a traffic sign and/or as a traffic monitoring unit and/or to be on an illumination unit and/or in a roadway.

The at least one traffic infrastructure sensor and/or the at least one additional traffic infrastructure sensor is/are preferably designed as a camera for monitoring the at least one traffic infrastructure area and/or as a radar sensor for measuring a vehicle velocity.

This yields the advantage that no traffic infrastructure sensors specifically provided for such purpose have to be used, but that the method can be carried out with already existing sensors, which is cost-effective, in particular, since no additional sensors have to be installed or the newly installed sensors have an additional use.

The second surroundings data values preferably include a first highly accurate position of the at least one traffic infrastructure sensor and/or the third surroundings data values include a second highly accurate position of the at least one additional traffic infrastructure sensor.

This yields the advantage that the first surroundings data values, in combination with the second surroundings data values and/or in combination with the third surroundings data values, are quickly and efficiently assigned a highly accurate position based on the second surroundings data values and/or on the third surroundings data values, and a highly accurate map is thus quickly and efficiently prepared. The assignment takes place, for example, by comparing surroundings features encompassed in the first surroundings data values with surroundings features, the highly accurate position of which is known based on the second surroundings data values and/or on the third surroundings data values. All surroundings features, highly accurately known with respect to their position, are then used to prepare the highly accurate map.

The device according to the present invention for preparing and providing a highly accurate map includes first means for receiving first surroundings data values, which represent a first surroundings of at least one vehicle, the first surroundings data values being detected with the aid of a surroundings sensor system of the at least one vehicle, and second means for receiving second surroundings data values, which represent a second surroundings of at least one traffic infrastructure area, the second surroundings data values being detected with the aid of at least one traffic infrastructure sensor. The device according to the present invention also includes third means for preparing the highly accurate map, based on the first surroundings data values and based on the second surroundings data values, and fourth means for providing the highly accurate map.

The first means and/or the second means and/or the third means and/or the fourth means is/are preferably designed to carry out a method according to one of the described methods.

Fifth means for receiving third surroundings data values is preferably also provided, the third surroundings data values representing at least partially the second surroundings of the traffic infrastructure area, the third surroundings data values being detected with the aid of at least one additional traffic infrastructure sensor.

Exemplary embodiments of the present invention are represented in the drawings and are explained in greater detail in the following description.

DETAILED DESCRIPTION

Figure 1:
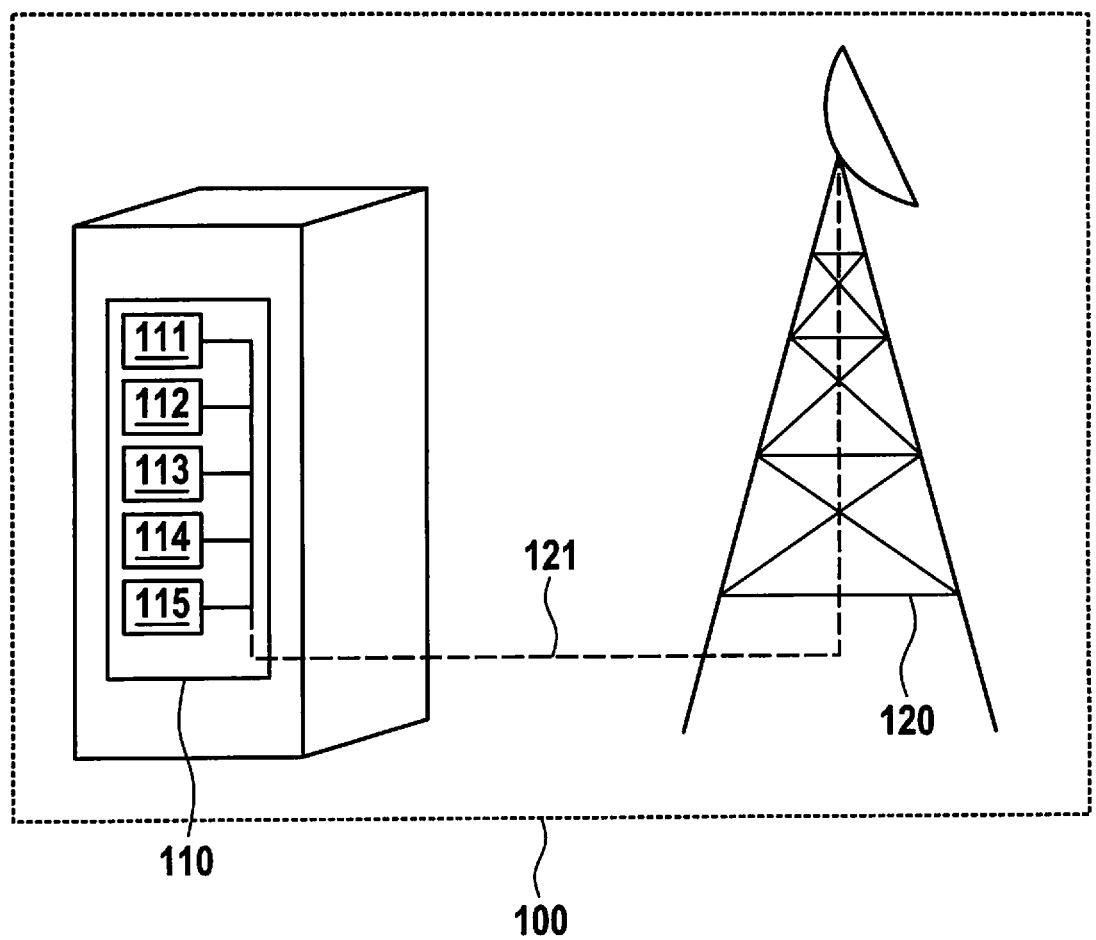
FIG. 1 shows device according to an example embodiment of the present invention.

FIG. 1 shows an example processing unit 100 that includes a device 110 for preparing 330 and providing 340 a highly accurate map. The processing unit 100 is, for example, a server or a cloud, i.e., a grouping of at least two electrical data processing systems, which exchange data, for example, with the aid of the Internet. In another example embodiment, processing unit 100 is device 110.

Device 110 for preparing 330 and providing 340 a highly accurate map encompasses first means 111 for receiving 310 first surroundings data values, which represent a first surroundings 210 of at least one vehicle 200, the first surroundings data values being detected with the aid of a surroundings sensor system 201 of the at least one vehicle 200, and second means 112 for receiving 320 second surroundings data values, which represent a second surroundings 220 of at least one traffic infrastructure area 230, the second surroundings data values being detected with the aid of at least one traffic infrastructure sensor 231. Device 110 further encompasses third means 113 for preparing 330 the highly accurate map, based on the first surroundings data values and based on the second surroundings data values, and fourth means 114 for providing 340 the highly accurate map.

In another example embodiment, device 110 additionally encompasses fifth means 115 for receiving 325 third surroundings data values, the third surroundings data values representing at least partially second surroundings 220 of traffic infrastructure area 230, the third surroundings data values being detected with the aid of at least one additional traffic infrastructure sensor 232.

First means 111 and/or second means 112 and/or third means 113 and/or fourth means 114 and/or (if present) fifth means 115 can be variously designed—as a function of the respective specific embodiment of processing unit 100. If processing unit 100 is designed as a server, first means 111 and/or second means 112 and/or third means 113 and/or fourth means 114 and/or fifth means 115 is/are situated at the same location relative to the location of first device 110.

If processing unit 100 is designed as a cloud, first means 111 and/or second means 112 and/or third means 113 and/or fourth means 114 and/or fifth means 115 can be situated at different locations, for example, in different cities and/or in different countries, a connection—such as, for example, the Internet—being designed to exchange (electronic) data between first means 111 and/or second means 112 and/or third means 113 and/or fourth means 114 and/or fifth means 115.

First means 111 are designed to receive first surroundings data values. In this case, first means 111 include a receiving unit and/or transmitting unit, with the aid of which data are requested and/or received. In another example embodiment, first means 111 are designed in such a way that these means—starting from device 110—are connected with the aid of a cable connection and/or cable-free connection 121, to an externally situated transmitting unit and/or receiving unit 122. First means 111 also include electronic data processing elements, for example, a processor, a working memory and a hard drive, which are designed to process the first surroundings data values, for example, to carry out a change and/or an adaptation of the data format and to subsequently forward it to third means 113. In another example embodiment, first means 111 are designed to forward the received surroundings data values—without data processing elements—to third means 113.

The device further encompasses second means 112, which are designed to receive second surroundings data values. For this purpose, second means 112 encompasses a receiving unit and/or transmitting unit, with the aid of which data are requested and/or received.

In another example embodiment, second means 112 are designed in such a way that these means—starting from device 110—are connected with the aid of a cable connection and/or cable-free connection 121, to an externally situated transmitting unit and/or receiving unit 122. In another example embodiment, the transmitting means and/or receiving means is/are identical to the transmitting means and/or receiving means of first means 111.

In another example embodiment, device 110 encompasses fifth means 115, which are designed to receive third surroundings data values. For this purpose, fifth means 115 encompasses a receiving unit and/or a transmitting unit, with the aid of which data are requested and/or received. In another example embodiment, fifth means 115 are designed in such a way that these means—starting from device 110—are connected with the aid of a cable connection and/or cable-free connection 121, to an externally situated transmitting unit and/or receiving unit 122. In another example embodiment, the transmitting means and/or receiving means is/are identical to the transmitting means and/or receiving means of first means 111 and/or with the transmitting means and/or receiving means of second means 115.

Device 110 further encompasses third means 113 for preparing 330 the highly accurate map based on the first surroundings data values and based on the second surroundings data values and/or—depending on the particular example embodiment—based on the third surroundings data values. For this purpose, third means 113 encompasses electronic data processing elements, for example, a processor, a working memory and a hard drive. Third means 113 further encompasses corresponding software, which is designed to prepare a highly accurate map based on the first surroundings data values and based on the second surroundings data values and/or based on the third surroundings data values.

In another example embodiment, the highly accurate map is prepared 330 by recognizing a first map as incomplete according to first predefined criteria and/or as not updated according to second predefined criteria and the highly accurate map is complete according to the first predefined criteria and/or is updated according to the second predefined criteria, and by replacing the first map with the highly accurate map.

For this purpose, third means 113 encompasses a receiving unit and/or transmitting unit, with the aid of which the first map is requested and/or received, for example, in the form of map data. In another example embodiment, the first map is requested and received with the aid of a transmitting unit and/or receiving unit of first and/or of second and/or of fourth and/or of fifth means 111, 112, 114, 115, or with the aid of externally situated transmitting unit and/or receiving unit 122.

The highly accurate map is prepared 330, for example, by determining the surroundings features, which are encompassed by the second surroundings data values and/or third surroundings data values with a highly accurate position. This takes place with the aid of suitable evaluation methods such as, for example, a comparison of size ratios and/or length ratios of the surroundings features, the highly accurate position of the at least one traffic infrastructure sensor 231 and/or of the at least one additional traffic infrastructure sensor 232 being used as the starting point. These surroundings features—in combination with their highly accurate positions, described for example in GPS coordinates—form the corner points of the highly accurate map.

Additional surroundings features, which are encompassed by the first surroundings features, are inserted accordingly between these corner points, and the exact position of these surroundings features encompassed by the first surroundings data values is determined based on the surroundings features of the second surroundings data values and/or of the third surroundings data values.

In an example embodiment, a so-called SLAM method is used to prepare 340 the highly accurate map. In this method, positions of surroundings features encompassed by the first surroundings data values and second surrounding data values and/or third surroundings data values are combined to form so-called graphs. Subsequently, relationships, for example, between multiple graphs originating from various trips of, for example, at least two vehicles are linked to one another and optimized with the aid of an additional step of the SLAM method. With method 300 described herein, it is then possible, for example, to use the surroundings features of the second surroundings data values and/or of the third surroundings data values as a boundary condition for the described SLAM method. The addition of these boundary conditions results in a better optimization result and, therefore, in a highly accurate map.

Device 110 further encompasses fourth means 114 for providing 340 the highly accurate map. For this purpose, fourth means 114 encompasses a receiving unit and/or a transmitting unit, with the aid of which, data can be requested and/or received. In another example embodiment, fourth means 114 are designed in such a way that these means—starting from device 110—are connected with the aid of a cable connection and/or cable-free connection 121, to an externally situated transmitting unit and/or receiving unit 122. In another example embodiment, the transmitting means and/or receiving means is/are identical to the transmitting means and/or receiving means of first means 111 and/or to the transmitting means and/or receiving means of second means 112 and/or to the transmitting means and/or receiving means of third means 113 and/or to the transmitting means and/or receiving means of fifth means 115.

Fourth means 114 further encompasses electronic data processing elements, for example, a processor, a working memory and a hard drive, which are designed to process the highly accurate map in the form of data values, for example, to carry out a change and/or adaptation of the data format and to subsequently provide a highly accurate map.

Figure 2:
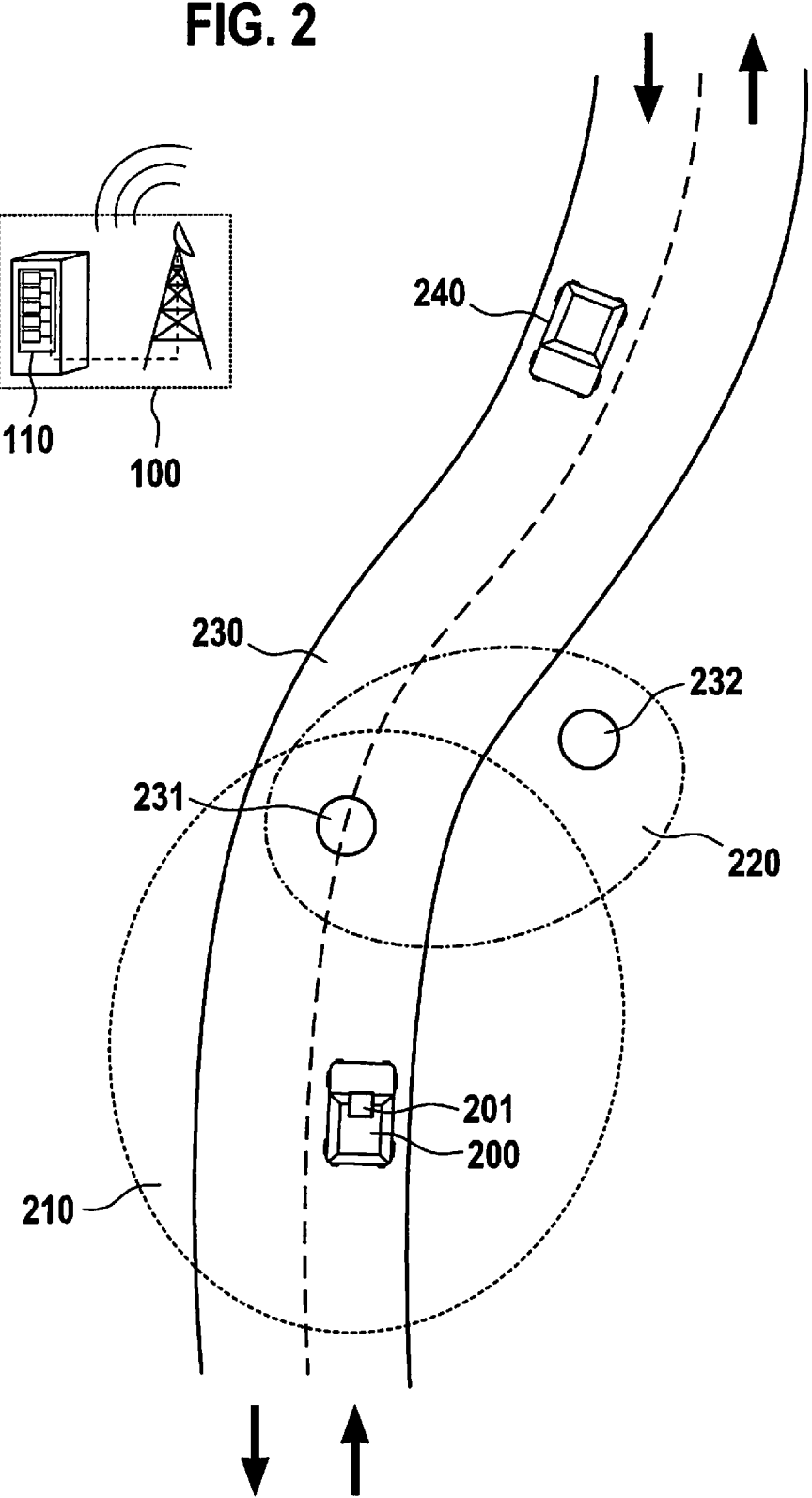
FIG. 2 illustrates a representation of a method according to an example embodiment of the present invention.

FIG. 2 shows an example embodiment of method 300 according to the present invention for preparing 330 and providing 340 a highly accurate map 400. In this case, first surroundings data values, which represent first surroundings 210 of at least one vehicle 200, are received. The first surroundings data values are detected with the aid of a surroundings sensor system 201 of the at least one vehicle 200. The first surroundings data values in this case include surroundings features, also called landmarks, which are encompassed by first surroundings 210. Second surroundings data values, which represent second surroundings 220 of at least one traffic infrastructure area 230, designed here by way of example as a road section, are received. The second surroundings data values are detected with the aid of at least one traffic infrastructure sensor 231.

In another example embodiment, third surroundings data values are additionally received, the third surroundings data values representing at least partially second surroundings 220 of traffic infrastructure area 230. The third surroundings data values are detected with the aid of at least one additional traffic infrastructure sensor 232.

The second surroundings data values and/or third surroundings data values encompass surroundings features which, for example, are also, but not necessarily exclusively, encompassed by the first surroundings data values, which are encompassed by second surroundings 220.

To transmit the first surroundings data values, the at least one vehicle 200 encompasses, for example, a transmitting unit and/or receiving unit, which is designed to transmit the first surroundings data values to first means 111 of device 110.

To transmit the second surroundings data values and/or third surroundings data values, the at least one traffic infrastructure sensor 231 and/or the at least one additional traffic infrastructure 232 each encompasses a transmitting unit and/or receiving unit, which is designed to transmit the second surroundings data values and/or the third surroundings data values to second means 112 and/or to fifth means 115 of device 110.

The highly accurate map is prepared 330 with the aid of third means 113 based on the first surroundings data values and based on the second surroundings data values and/or third surroundings data values. The highly accurate map is then provided in such a way that at least one additional vehicle 240 and/or the at least one vehicle 200 is/are operated in an automated manner as a function of the highly accurate map.

Surroundings features are understood to mean, for example, structures (buildings, bridges, tunnels, etc.), infrastructure features (roads, traffic signs, road signs, guardrails, curbs, street lamps, etc.), landscape features (plants, mountains, lakes, rivers, etc.) roadway markings, etc.

Figure 3:
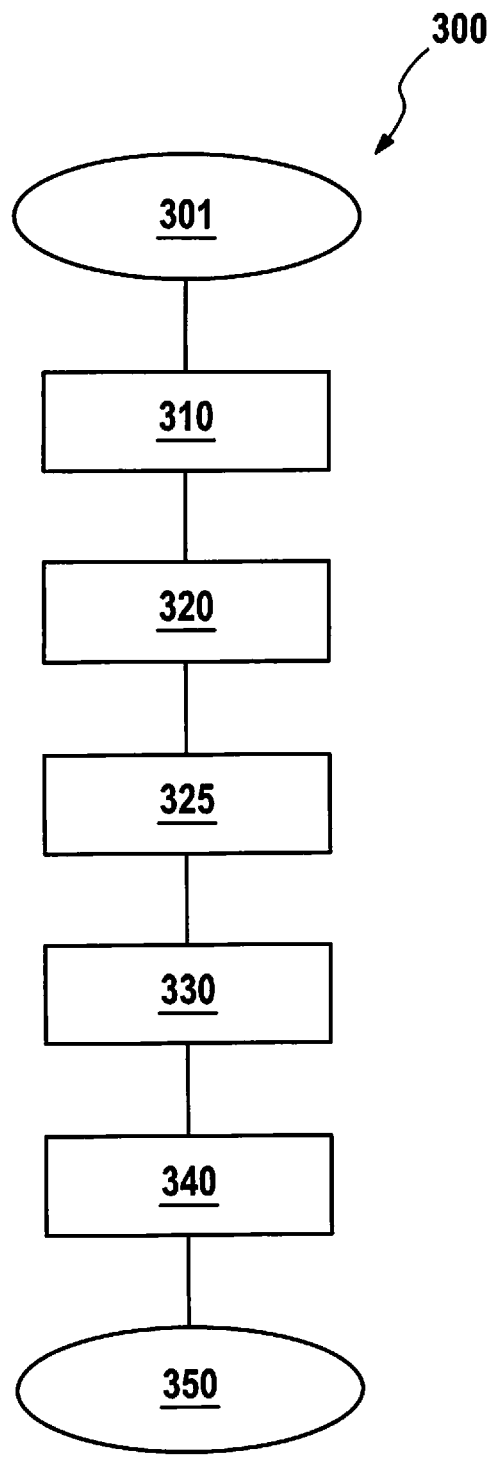
FIG. 3 is a flowchart representing a method according to an example embodiment of the present invention.

FIG. 3 shows an exemplary embodiment of a method 300 for preparing 330 and providing 340 a highly accurate map. Method 300 starts with step 301. In step 310, first surroundings data values, which represent first surroundings 210 of at least one vehicle 200, are received, the first surroundings data values being detected with the aid of a surroundings sensor system 201 of the at least one vehicle 200.

In step 320, second surroundings data values, which represent second surroundings 220 of at least one traffic infrastructure area 230, are received, the second surroundings data values being detected with the aid of the at least one traffic infrastructure sensor 231.

In step 325, third surroundings sensor data are received, the third surroundings data values representing at least partially second surroundings 220 of traffic infrastructure area 230, the third surroundings data values being detected with the aid of at least one additional traffic infrastructure sensor 232.

Steps 310, 320 and 325 can be carried out in any arbitrary sequence. Step 325 is optional. Whether or not step 325 is carried out is a function of the respective design of method 300.

In step 330, the highly accurate map is prepared based on the first surroundings data values and based on the second surroundings data values. In step 340, the highly accurate map is provided. Method 300 ends in step 350.

What is claimed is:

1. A method comprising:
    obtaining, by a processor, first surroundings data values that are detected by at least one sensor of at least one vehicle and that represent first surroundings, which are of the at least one vehicle;
    obtaining, by the processor, second surroundings data values that are detected by at least one traffic infrastructure sensor and that represent second surroundings, which are of at least one traffic infrastructure area, wherein the at least one traffic infrastructure sensor is external to and separate from the at least one vehicle, and the at least one traffic infrastructure sensor is a sensor of at least one traffic infrastructure component;
    generating, by the processor, a first map using both the first surroundings data values and the second surroundings data values; and
    the processor outputting the first map.

2. The method of claim 1, further comprising:
    determining that a second map is incomplete based on first predefined criteria and not updated based on second predefined criteria, wherein the first map is complete according to the first predefined criteria and updated according to the second predefined criteria, and the output of the first map includes replacing the second map with the first map.

3. The method of claim 1, further comprising:
    determining that a second map is incomplete based on predefined criteria, wherein the first map is complete according to the predefined criteria and the output of the first map includes replacing the second map with the first map.

4. The method of claim 1, further comprising:
    determining that a second map is not updated based on predefined criteria, wherein the first map is updated according to the predefined criteria, and the output of the first map includes replacing the second map with the first map.

5. The method of claim 1, wherein the first map is generated by at least one of assessing and changing the first surroundings data values according to predefined criteria and as a function of the second surroundings data values.

6. The method of claim 1, wherein the first map is output such that at least one of the at least one vehicle and an additional vehicle is operated in an automated manner as a function of the map.

7. The method of claim 1, further comprising:
    obtaining third surroundings data values that at least partially represent the second surroundings and that are detected by at least one additional traffic infrastructure sensor, wherein the at least one additional traffic infrastructure sensor is external to and separate from the at least one vehicle, and the at least one additional traffic infrastructure sensor is a sensor of at least one additional traffic infrastructure component;
    selecting which of the second and third surroundings data values to use for the generating of the map depending on a surroundings condition of the second surroundings.

8. The method of claim 1, wherein the at least one traffic infrastructure sensor is a camera for monitoring the at least one traffic infrastructure area.

9. The method of claim 1, wherein the at least one traffic infrastructure sensor is a radar sensor for measuring a vehicle velocity.

10. The method of claim 1, wherein the second surroundings data values encompass a first highly accurate position of the at least one traffic infrastructure sensor.

11. A device comprising:
    a processor communicatively coupled to at least one sensor of at least one vehicle and to at least one traffic infrastructure sensor, wherein the processor is configured to:
        obtain first surroundings data values that are detected by the at least one sensor of the at least one vehicle and that represent first surroundings, which are of the at least one vehicle;
        obtain second surroundings data values that are detected by the at least one traffic infrastructure sensor and that represent second surroundings, which are of at least one traffic infrastructure area, wherein the at least one traffic infrastructure sensor is external to and separate from the at least one vehicle, and the at least one traffic infrastructure sensor is a sensor of at least one traffic infrastructure component;
        generate a first map based on both the first surroundings data values and the second surroundings data values; and
        output the first map.

12. The device of claim 11, wherein the processor is configured to obtain third surroundings data values that at least partially represent the second surroundings and that are detected by at least one additional traffic infrastructure sensor, and the first map is generated based also on the obtained third surroundings data values, wherein the at least one additional traffic infrastructure sensor is external to and separate from the at least one vehicle, and the at least one additional traffic infrastructure sensor is a sensor of at least one additional traffic infrastructure component.

13. The method as recited in claim 1, wherein the processor includes a server, the server being external to and separate from the at least one vehicle and the at least one traffic infrastructure.

14. The method as recited in claim 1, wherein the processor includes a grouping of at least two electrical data processing systems which exchange data, the grouping being external to and separate from the at least one vehicle and the at least one traffic infrastructure.

15. The device as recited in claim 11, wherein the processor includes a server, the server being external to and separate from the at least one vehicle and the at least one traffic infrastructure.

16. The device as recited in claim 11, wherein the processor includes a grouping of at least two electrical data processing systems which exchange data, the grouping being external to and separate from the at least one vehicle and the at least one traffic infrastructure.

17. The method as recited in claim 1, wherein the first map includes a map of the first surroundings including geo-positions, and/or a map of the second surroundings including geo-positions.

18. The method as recited in claim 1, wherein the first map includes a radar map and/or a LIDAR map.

* * * * *